United States Patent [19]

Klufas et al.

[11] Patent Number: 4,581,816

[45] Date of Patent: Apr. 15, 1986

[54] METHOD AND APPARATUS FOR WELDING TURBINE ROTOR SHAFTS

[75] Inventors: Oleg Klufas; Calvin H. Soldan, both of Schenectady; William V. Coll, Jr., Scotia, all of N.Y.

[73] Assignee: General Electric Company, Schenectady, N.Y.

[21] Appl. No.: 605,020

[22] Filed: Apr. 27, 1984

[51] Int. Cl.$^4$ .................. B23P 21/00; B23Q 15/00; B23K 37/04

[52] U.S. Cl. ................. 29/705; 29/156.8 R; 29/407; 29/464; 29/709; 29/714; 29/720; 29/721; 29/DIG. 48; 228/44.5; 228/48; 228/56.5; 228/103; 228/44.3

[58] Field of Search ............... 29/156.8 R, 407, 464, 29/705, 709, 714, 720, 721, DIG. 48; 228/44.1 R, 44.5, 48, 56.5, 103, 49 B

[56] References Cited

U.S. PATENT DOCUMENTS

| | | | |
|---|---|---|---|
| 3,115,859 | 12/1963 | Häussler et al. | 228/44.5 X |
| 3,284,883 | 11/1966 | Haverfield et al. | 228/49 B |
| 3,400,872 | 9/1968 | Rogers | 228/44.5 |
| 3,772,753 | 11/1973 | Sargeant | 29/721 |
| 3,882,299 | 5/1975 | Sciaky | 228/44.5 X |
| 3,901,497 | 8/1975 | Dearman | 228/44.5 X |
| 4,216,896 | 8/1980 | Chang et al. | 228/212 |

FOREIGN PATENT DOCUMENTS

| | | | |
|---|---|---|---|
| 3220027 | 1/1983 | Fed. Rep. of Germany | 228/103 |
| 71739 | 5/1982 | Japan | 29/714 |
| 1435004 | 5/1976 | United Kingdom | 228/44.5 |

Primary Examiner—Howard N. Goldberg
Assistant Examiner—Ronald S. Wallace
Attorney, Agent, or Firm—Jerome C. Squillaro; Paul Checkovich

[57] ABSTRACT

A method for axially aligning adjacent opposing faces of a first and second shaft segment having a respective joint face, of a steam turbine rotor to be welded together includes mating the joint faces of each shaft segment, placing a crushable lip, which axially extends from one of the joint faces, under an axially compressive force, and supporting the joined shaft segments at their axially outboard ends. An apparatus for axially aligning opposing end faces of a first and second shaft segment to be welded together, the first and second shaft segments including a respective joint face, comprises an adjustable support for raising and lowering the joined shaft segments thereby changing the axial distance across the annular groove defined by adjacent opposing end faces to be welded. Means for measuring the force at the adjustable support, provides an indication of the weight counteracted by the support when optimum axial alignment of the shaft segments is achieved. Heating regions proximate adjacent opposing end faces and welding adjacent end faces together are accomplished while maintaining optimum axial alignment of the shaft segments.

13 Claims, 6 Drawing Figures

METHOD AND APPARATUS FOR WELDING TURBINE ROTOR SHAFTS

BACKGROUND OF THE INVENTION

This invention relates generally to a method and apparatus for welding steam turbine rotor shafts and, more particularly, to apparatus and method for axially aligning rotor shaft segments to be welded to form the shaft and maintaining alignment of the segments while welding.

Shafts of steam turbine rotors typically have very large radial dimensions, on the order of two to three feet, and may have an axial extent exceeding 30 feet. Because of such axial length and resulting weight, it may not be feasible to manufacture a shaft from a single integral piece of metal. Typically, two or more shaft segments, having a total axial dimension at least as great as the desired overall length of the shaft may be aligned and welded together to form the shaft. Additional machining may be required. During a welding procedure, shaft segments are rotated and weldment is typically applied by a stationary welding head which deposits weldment in the volume between opposing axial end faces of shaft segments to secure opposing axial end faces of segments together. Precise axial alignment between shaft segments to be welded together should be achieved prior to and maintained while welding to ensure integrity of the weld affixing adjacent opposing end faces of shaft segments together. If shaft segments are rotated relative to each other, any axial misalignment of adjacent end faces may cause the weld to crack or may produce inclusions within the weld. Additionally, rotation of the rotor while supported at axial positions outboard the weld may cause the weld to crack because of unequal stresses placed on the weld by the weight component force of the rotor. As is recognized by persons of ordinary skill in the art, inclusions in such welds are generally not acceptable due to stresses placed on the shaft during turbine operation. As used herein, the term "axial centerline" is meant to designate the center of rotation of the particular device or apparatus. A person of ordinary skill in the art recognizes that turbine rotors, comprising segments which have been welded together to form a rotor, have axial centerlines that may be within certain acceptable operational tolerances. In other words, the actual axial centerline must be within a predetermined distance from the "ideal" axial centerline. The term "axial centerline" referred to herein is meant to include such tolerances.

Before welding shaft segments together, the shaft segments must be preheated to a predetermined appropriate temperature for the weldment used. In a welding operation, the preheat temperature was about 500° F. At that temperature, measuring means designed to maintain axial alignment by spanning the axial distance in the annular groove between adjacent end faces of the shaft segments, may be greatly affected by temperature so as to produce inaccurate or inconsistent results. it is important to maintain a circumferentially uniform axial distance between the opposing axial end faces of rotor segments to be welded in order to ensure axial centerline alignment between the two shaft segments.

OBJECTS OF THE INVENTION

It is an object of the present invention to provide a method for axially aligning shaft segments of a steam turbine rotor and maintaining axial alignment while welding opposing end faces of the shaft segments together.

It is another object of the present invention to provide an apparatus for axially aligning the shaft segments and for maintaining alignment while welding opposing end faces of the shaft segments together.

It is a further object of the present invention to provide an apparatus and method for reducing the possibility of weld cracking during cooling of the weldment and regions of the shaft adjacent the weldment and for reducing the possibility of inclusions developing in the weld.

It is an additional object of the present invention to provide an apparatus and method for maintaining axial alignment of shaft segments during application of heat in the region adjacent end faces of the segments.

SUMMARY OF THE INVENTION

A method for axially aligning and welding adjacent end faces of two shaft segments of a steam turbine rotor together includes mechanically joining the shaft segments at corresponding, mating, joint faces. This joining procedure places a crushable annular lip, a lip axially extending from the radially inner portion of one of the joint faces, under an axially compressive force to create a thermal expansion annular space axially across the lip. Joined shaft segments are supported at the axially outboard end respectively. One of the shaft segments is adjustably supported at an axially intermediate position. At the intermediate position, the force counteracts the weight of the shaft segments and is measured. The axial extend of the annular groove, formed by the adjacent end faces of the joined shaft segments, is measured at a plurality of circumferentially and radially equidistant locations. The variance between axial measurements is minimized by adjusting the support and hence the force. The force is recorded when the variance is minimized, the region adjacent the adjacent end faces of the shaft portions is heated, and the adjacent end faces are welded together. Both of these last steps occurring while the recorded force is substantially maintained.

An embodiment of the present invention includes a first shaft segment having a bore through its axial centerline and a second shaft segment having a bore partially extending along its axial centerline and open to the adjacent end surface of the second shaft segment to be welded to the first shaft segment. Each adjacent opposing end face of first and second shaft segments, respectively includes a circumferential, mateable first and second joint face, respectively, at a radially inner portion. These joint faces are mutually matingly engageable. A crushable annular lip axially extends from the radially inner portion of one of the joint faces. An axial bolting means extends through the bore of the first shaft segment and extends partially into the partial bore of the second shaft segment. One axial end of the bolting means is connected to the axially outboard end of the first shaft segment and the other axial end is connected to the second shaft segment. The bolting means matingly causes first joint face and second joint face to mutually engage and adjacent opposing end faces of first and second shaft segments form an annular groove therebetween. The bolting means may also provide an axially compressive force on the crushable annular lip. The apparatus further includes means for rotatably supporting the shaft segments at the respective axially outboard ends thereof. A leveraging means supports one of the shaft segments at an axially intermediate point. The leveraging means includes means for altering the force counteracting the weight of both shaft segments. The apparatus further includes means for minimizing the axial variances in the annular groove between the adjacent end faces. The minimizing means includes a measuring means and a comparing means to measure and compare the axial distance across the annular groove at a plurality of circumferential and radially equidistant locations. Means for altering the force at the lever arm is affected by the minimizing means to minimize the variance in the measured axial distance across the annular groove. Means for heating the shaft portions and means for applying weldment in the annular groove is also provided to affix the adjacent end faces together.

BRIEF DESCRIPTION OF THE DRAWING

The invention, together with additional objects and advantages thereof, is better understood by the following detailed description, however, the claims, appended to the concluding portion of the specification, distinctly point out and particularly claim the present invention, in which:

DETAILED DESCRIPTION OF THE INVENTION

This invention relates generally to a method and apparatus for axially aligning two shaft segments of a turbine rotor and, particularly, to a method and apparatus for optimizing shaft alignment while welding to join respective axial ends of the shaft segments together to form a contiguous shaft. Like numerals designate like elements throughout all Figures.

Figure 1:
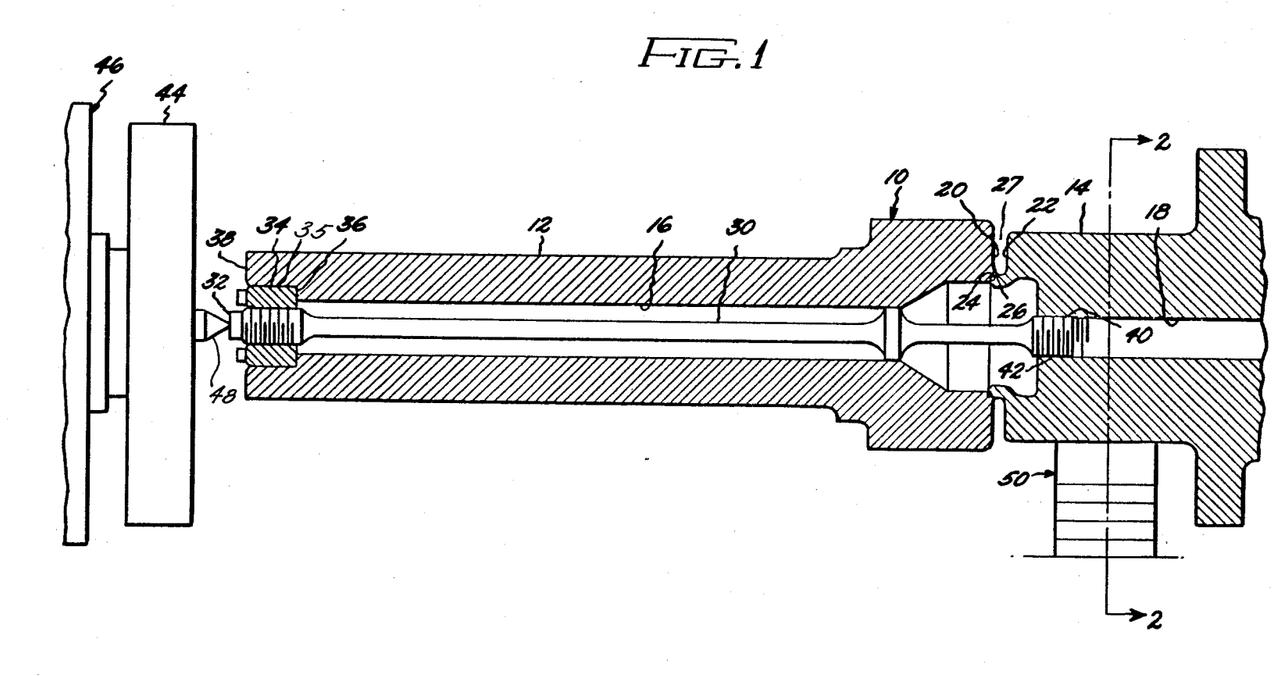
FIG. 1 illustrates tangential, schematic view of two shaft segments bolted together in accordance with the present invention.

FIG. 1 illustrates a tangential schematic view of a mechanically joined turbine rotor 10. Rotor 10 includes a first shaft portion or segment 12 and a second shaft portion or segment 14. First shaft segment 12 includes a through bore 16 generally centered along its axial centerline. The centerline of bore 16 is within acceptable tolerances of the true axial centerline of shaft segment 12. Shaft segment 14 includes at least a partial bore 18 generally centered along its axial centerline. Bore 18 may extend entirely through shaft segment 14. Shaft segments 12 and 14 include adjacent opposing axial end faces 20 and 22, respectively. Rotor 10 further includes a pair of circumferential, mateable joint faces 24 and 26 axially extending from the radially inner portion of opposing end face 20 and 22, respectively. Joint faces 24 and 26 are matingly engageable, and, in this illustrated embodiment, joint faces 24 and 26 form an annular rabbet joint. An annular groove 27 is defined by axially spaced apart end face 20 and 22. The radially inner portion of annular groove 27 is radially closed off by the mating fit of joint faces 24 and 26.

Shaft segment 12 and 14 are joined together by axial bolting means 30. Threads extend from the axially outboard end 32 of bolting means 30. Block 34 fits into a recess 35 generally centered about the axial end of bore 16 terminating at end 38 of shaft segment 12. Recess 35 has a larger diameter than bore 16 thereby forming a shoulder 36 therebetween. Block 34 is threaded onto bolting means 30 from end 32 thereof. The other axial end 40 of bolting means 30 is connected or secured to shaft segment 14 at opening 42 of partial bore 18. Opening 42 is adjacent end face 22. End 40 of bolting means 30 includes threads and is threaded onto mating threads of bore 18 extending a sufficient distance from opening 42 into bore 18 to provide adequate purchase for securely mating joint faces 24 and 26. In this fashion, bolting means 30 mechanically joins shaft segment 12 to shaft segment 14 by mating joint faces 24 and 26 together. After bolting means 30 is secured to shaft segment 14, block 34 may be rotated causing shaft segment 14 to forceably compressively engage shaft segment 12.

Outboard end 38 of shaft segment 12 is supported by a section 44 of support means 46, such as a lathe connected to outboard end 32 of bolting means 30. Lathe 46 provides means for supporting shaft segment 12 and is connected to end 32 of bolting means 30 by cone-shaped support 48 of section 44. Support 48 supports rotor 10 at the axial centerline of shaft segment 12, which centerline is geneally colinear with the axial centerline of bolting means 30. Leveraging means 50 supports shaft segment 14.

Figure 2:
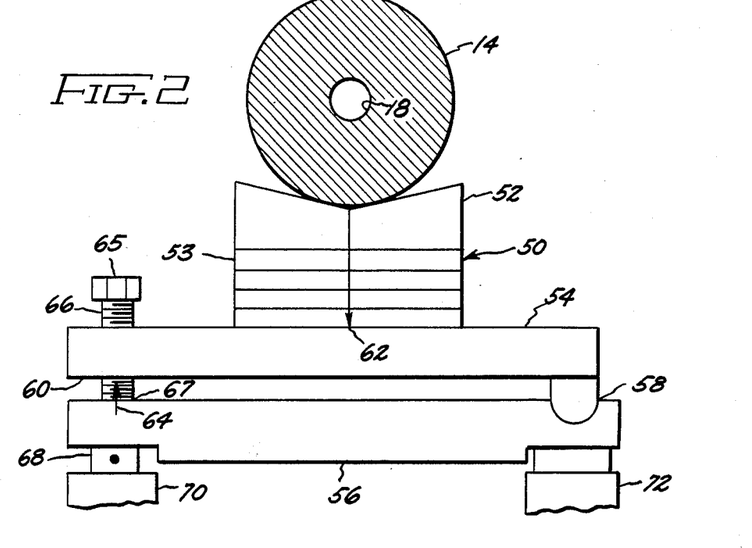
FIG. 2 illustrates an axial schematic view from the perspective of section lines 2—2 of FIG. 1.

FIG. 2 illustrates an axial, schematic view of leveraging means 50 as viewed from the perspective of section line 2—2 of FIG. 1. Leveraging means 50 comprises a V-shaped support block 52, a plurality of support blocks, one of which is referenced support block 53, a lever arm 54, a base portion 56, a fulcrum or pivot 58, and a support point 60. Fulcrum 58 is, in this embodiment, a hinge with one side attached to lever arm 54 and the other side attached to base portion 56. The axial extent of fulcrum 58 is adequate to support the weight of shaft segments 12 (FIG. 1) and 14 and other forces acting on lever arm 54. Shaft segment 14 is supported by support block 52 and purality of support blocks 53 interemdiate fulcrum 58 and support point 60. An arrow 62 generally designates the force vector of the weight carried by lever arm 54.

Leveraging means 50 also includes biasing means 65 for altering force applied at support point 60. The force, designated generally by an arrow 64, counteracts the portion of force 62 transmitted through lever arm 54. Biasing means 65 comprises a screw type adjustment means 66 which raises or lowers lever arm 54 with respect to base 56 to pivot about fulcrum 58 and a mating threaded portion through lever arm 54 at support point 60. Axial end 67 of adjustment means 66 may abut the upper surface of base 56. A person of ordinary skill in the art recognizes that, when lever arm 54 is pivoted clockwise (as viewed in FIG. 2) (support point 60 of lever arm 54 moves up with respect to base 56) by adjustment means 66, force 64 at support point 60 is reduced because force vector 62, is directed more towards fulcrum 58 than towards support point 60. If adjustment means 66 pivots lever arm 54 counter clockwise (support point 60 of lever arm 54 moves down with respect to base 56), a greater force 64 would be required at support point 60 due to the tangential component of the weight vector 62.

Alternate means for changing force 64 applied at support point 60 may be employed. Such alternate means include hydraulic actuators, mechanical jacks, and other mechanisms for pivoting lever arm 54 about fulcrum 58. Leveraging means 50 further includes means 68, such as a load cell, for measuring force 64 at support point 60. Load cell 68 may be periodically calibrated in accordance with United States Bureau of Standards procedures. Load cell 68 comprises a force transducer (not shown) which measures the weight or force 64 at support point 60 and produces a voltage proportionate to the measured force. Load cell 68 is disposed between pedestal 70 and base 56 to monitor the vertical component of force at support point 60. A pedestal 72 supports the other end of base 56 adjacent to fulcrum 58. The other ends of pedestals 70 and 72 (not shown) remote from base 56, are generally connected to a physically stable reference (not shown) such as the ground, able to support the entire weight of rotor 10 (FIG. 1) and associated apparatus in a consistent physical configuration. Load cell 68 may be disposed in any location so as long as the entire vertical force at support point 60 is sensed by load cell 68.

Figure 3:
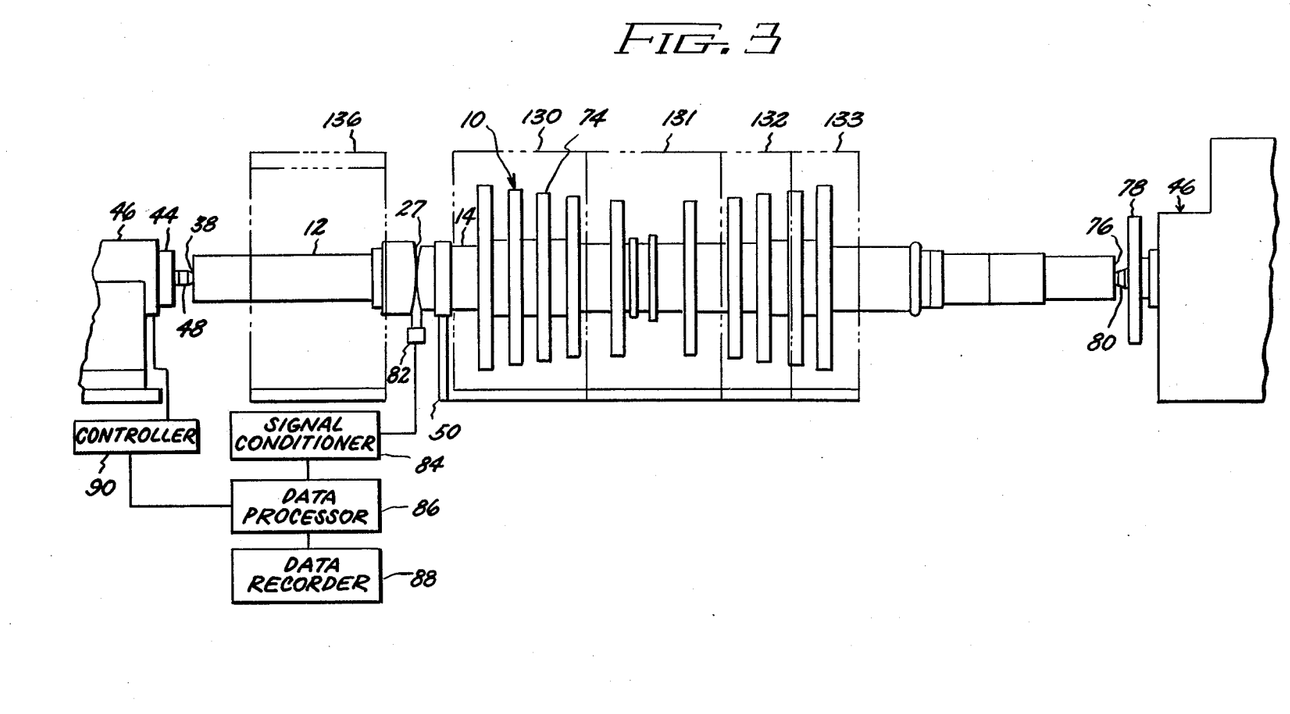
FIG. 3 illustrates a tangential, schematic view of the joined shaft segments, the heater sections, and means for measuring axial distance in an annular groove while the shaft segments are rotated in accordance with the present invention.

FIG. 3 illustrates a tangential, schematic view of rotor 10 in accordance with the present invention. Rotor 10 further comprises a plurality of axially spaced apart turbine wheels, one of which is designated as wheel 74 secured to shaft portion 14. A person of ordinary skill in the art recognizes that the plurality of turbine wheels is not necessary to practice this invention, but the wheels are illustrated for exemplary purposes only.

The outboard end 76 of shaft segment 14 is connected to another section 78 of lathe 46. Section 78 of lathe 46 may be designated as the headstock of lathe 46, and section 44 may be designated as the tailstock of lathe 46 for convenience. As used herein, the term "outboard" referes to elements axially distant from opposing end faces 20 and 22 (FIG. 1) which define annular groove 27. Outboard end 76 of shaft segment 14 is connected to section 78 of lathe 46 by a cone-shaped support 80 at the axial centerline of shaft segment 14.

Leveraging means 50 is situated axially intermediate outboard end 76 of shaft segment 14 and annular groove 27 preferably much closer to annular groove 27. Since shaft segment 14 is supported at outboard end 76 thereof and shaft segment 12 is supported at outboard end 38 thereof, leveraging means 50 can be adjusted up or down, as hereinbefore explained, to change the axial distance from end face 20 (FIG. 1) to end face 22 (FIG. 1) across annular groove 27 at any circumferential location of annular groove 27. A person of ordinary skill in the art recognizes that by raising lever arm 54 (illustrated in FIG. 2) the axial extent of the portion of annular groove 27 above the centerline of shaft segments 12 and 14 would increase, whereas the axial extent of the portion of annular groove 27 below the centerline of shaft segments 12 and 14 would decrese. A person of ordinary skill in the art recognizes that the axial position of leveraging means 50 along rotor 10 can be changed. Likewise, a person of ordinary skill in the art recognizes that leveraging means 50 could support shaft segment 12 rather than shaft segment 14 as illustrated. A person of ordinary skill in the art recognizes that leveraging means 50 could be replaced by any other means for adjusting the elevation of one of shaft segments 12 and 14 with respect to the other shaft segment. Such an adjustment means is disposed at an axially distant location from the axially outboard ends of the shaft portions. A load cell is placed under such an adjustment means (which could be a hydraulic jack) and the force at the axially intermediate location is measured. In this instance, the shaft portions act as "lever arms" since the axially outboard ends are fixed and, by changing the inboard elevation, the force at the axially intermediate location changes correspondingly.

Figure 4:
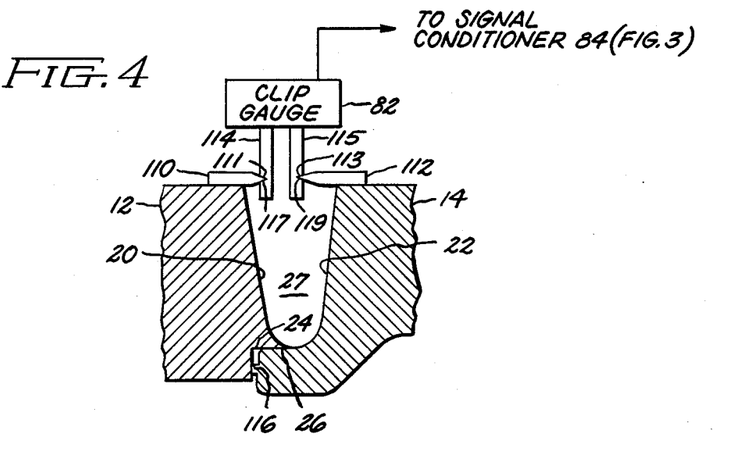
FIG. 4 illustrates a partial, cross-sectional blown up view of a portion of the annular groove including a clip gauge in accordance with the present invention.

A measuring means 82, such as a clip gauge, may be used to determine the axial distance across annular groove 27. Clip gauge 82 provides an electrical signal indicative of the axial distance across annular groove 27. The signal output of clip gauge 82 is coupled to the input of a signal conditioner 84. The output of signal conditioner 84 is connected to an input of a data processor 86 and an output of data processor 86 is connected to the input of a data recorder 88. A controller 90 monitors the speed of rotation of lathe 46 and supplies a speed signal to an input of data processor 86. FIG. 4 illustrates, a tangential, cross-sectional, partial blown up view of a portion of annular groove 27. To optimize axial alignment of shaft segments 12 and 14, a measuring means 82, such as a clip gauge, for determining the axial distance across annular groove 27 may be disposed to measure the axial displacement between opposing end face surfaces 20 and 22 along a path radially equidistant from the centerline of shaft segments 12 and 14. A support bar 110 having a reference means 111, such as a knife edge or conical termination, and a support bar 112 having a reference means 113, such as a knife edge or conical termination, are fixedly secured to the periphery of shaft segments 12 and 14, respectively. Clip gauge 82 comprises probes 114 and 115 having retention means 117 and 119, respectively, such as a groove or conical recess, for matingly engaging reference means 111 and 113, respectively. Probes 114 and 115 of clip gauge 82 may be coupled to respective transducers (not shown) of clip gauge 82 for providing an electrical signal indicative of the magnitude of relative movement between probes 114 and 115. Support bar 110 and 112 respectively extend from inboard ends of shaft segments 12 and 14, respectively, such that reference means 111 and 113 are spaced from each other and are able to engage probes 114 and 115, respectively, of clip gauge 82. It is desirable that engagement between reference means 111 and 113, respectively, and retention means 117 and 119, respectively, be repeatable so that if clip gauge 82 is removed and later reengaged, the distance measured across groove 27 for a predetermined rotational position of shaft segments 12 and 14 will not vary, in order that proper axial alignment between shaft segments 12 and 14 may be verified. Clip gauge 82 is rotated at the same rate as rotor 10 (FIG. 1) during alignment in order to maintain engagement of probes 114 and 115, respectively, with reference means 110 and 112, respectively, thereby maintaining a fixed circumferential position with respect to rotor 10 (FIG. 1).

Clip gauge 82 may be any measuring device capable of measuring the axial distance across annular groove 27 at a predetermined circumferential position of groove 27. A clip gauge useful with the present invention may be fabricated in accordance with the specifications in an article entitled "Design and Use of Displacement Gauge for Crack Extension Measurements," NASA PN D-3724, by D. Fisher, R. C. Bubsey, J. E. Srawley, published in 1966 which is incorporated herein by reference.

Returning to FIG. 3, signal conditioner 84 provides power and any other necessary electrical information to clip gauge 82. For example, signal conditioner 84 may include amplifiers, filters, and other electrical items well known to persons of ordinary skill in the art. Data processor 86 accepts the conditioned signals from signal conditioner 84 and combines those signals with speed data from controller 90. In one embodiment, data recorder 88 is a strip recorder which displays any variance in the axial extent of annular groove 27 when the joined shaft portions 12 and 14 are rotated by lathe 46. The connections and operations of the signal conditioner, data processor, data recorder, and controller are well known to persons of ordinary skill in the art.

The radially inner portion of annular groove 27 is closed off by mating joint faces 24 and 26 which are held in abutting contact by bolting means 30 (FIG. 1). Joint face 26 includes a crushable annular lip 116 (FIG. 4) which axially spaces the radially inner portions of joint faces 24 and 26 apart and may be an integral part of shaft segment 14. Bolting means 30 (FIG. 1) may be operated to place lip 116 under an axially compressive force. In one embodiment, this prestressed loaded bolt applies an axially compressive force on the order of 100,000 lbs. per inch on the apparatus. The compressive force developed by bolting means 30 (FIG. 1) prestresses lip 116 (FIG. 4) and also prevents torsional slip of shaft segments 12 and 14 with respect to each other during rotation of rotor 10 (FIG. 1) by lathe 46.

Optimal axial alignment of shaft segments 12 and 14 may be obtained by measuring the axial extent of annular groove 27 at a plurality of circumferential radially equidistant locations, such as by rotating rotor 10 (FIG. 1) while maintaining clip gauge 82 in a fixed circumferential position with respect to rotor 10. the measured axial distances will be unequal when axial alignment of shaft segments 12 and 14 is not optimal due in part to stresses on shaft segments 12 and 14 caused by the weight of respective shaft segments 12 and 14. The measured axial distances are compared to each other and the height of lever arm 54 (FIG. 2) is adjusted such as by altering the force applied at support point 60 (FIG. 2). Optimal axial alignment between shaft segments 12 and 14 is achieved when the axial extent of annular groove 27 at each point measured is equal to the axial extent of annular groove 27 at each other point measured.

Figure 5:
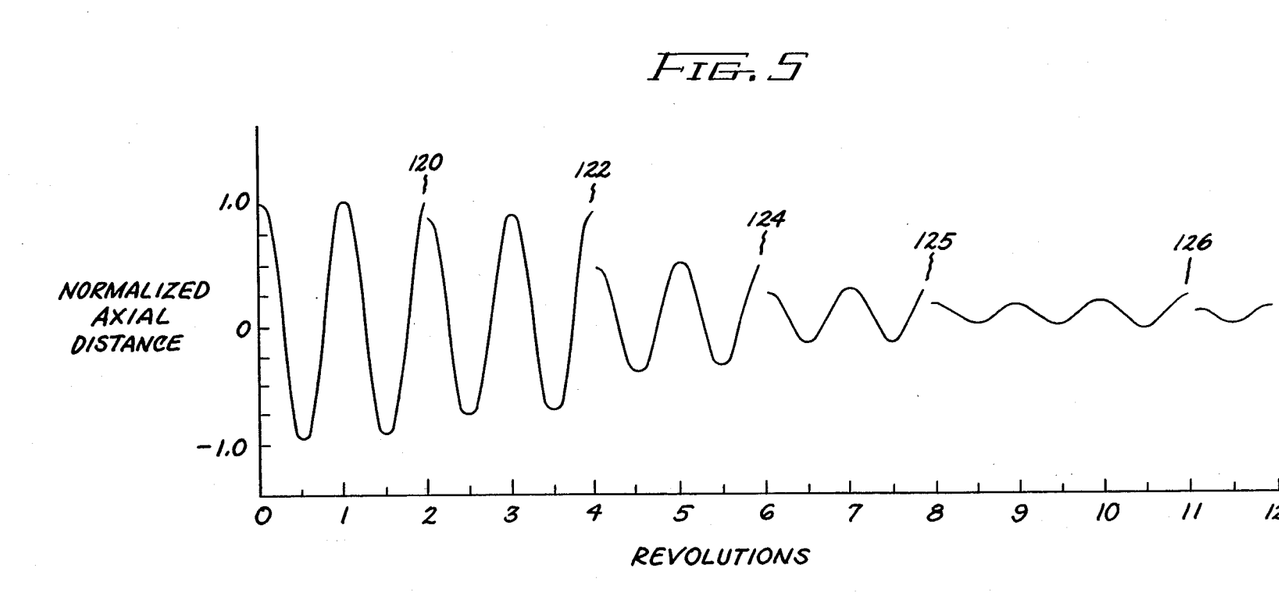
FIG. 5 illustrates an example of a graph comparing the normalized axial distance across the annular groove per revolution of the shaft in accordance with the present invention.

Referring to FIG. 5, a typical graph showing the normalized axial distance between end face 20 and 22 (FIG. 4) versus number of revolutions of rotor 10 (FIG. 1) is illustrated. As used herein, "normalized axial distance" is that axial distance which is normalized with respect to the greatest axial distance measured in annular groove 27 between face 20 and 22 (FIG. 4). The graph in FIG. 5 assumes that clip gauge 82 (FIG. 4) is placed at the largest axial extent location in annular groove 27 (FIG. 4) at the beginning of the alignment procedure. By displaying variance in axial distance between face 20 and 22 (FIG. 4) as shaft segments 12 and 14 are rotated, a substantially sinusoidal curve is developed as illustrated. After at least one complete revolution of rotor 10 (FIG. 1), rotation of rotor 10 (FIG. 1) is halted and lever arm 54 (FIG. 2) is adjusted to reduce the maximum axial distance across annular groove 27 (FIG. 4) as measured by clip gauge 82 (FIG. 4). Measuring axial distance between face 20 and 22 (FIG. 4), comparing normalized measurements, and altering force 64 (FIG. 2) applied at support point 60 (FIG. 2) of lever arm 54 (FIG. 2) provides a method for minimizing axial distance variances between end face 20 and 22 (FIG. 4) in annular groove 27 (FIG. 4). Minimization of axial distance variances is achieved when the amplitude of the sinusoidal wave of FIG. 5 is minimized. Typically, the amplitude of the sinusoidal wave will become smaller and smaller from point 120 and proceeding through points 122, 124, 125 and 126 as the above described procedure is repeated. A minimized sinusoidal wave is indicative of optimal axial alignment between shaft segments 12 and 14.

In one embodiment, the steps of adjusting force 64 on leveraging means 50 and rotating shaft portions 12 and 14 are continuously repeated until a minimal amplitude in the sine wave is obtained. When the minimal amplitude is recognized in the sine wave, load cell 68, illustrated in FIG. 2, is read and force 64 is recorded. In one preferred embodiment, a series of minimal sine waves are noted and the corresponding number of load cell recordings are averaged together to obtain the optimal force needed to support shaft segments 12 and 14 (FIG. 4) in optimal axial alignment.

Returning to FIG. 3, rotor 10 includes a plurality of heaters 130, 131, 132 and 133 disposed radially about and axially along shaft segment 14. heater 136 is disposed radially about shaft segment 12. Heaters 130, 131, 132, 133 and 136 preheat shaft segments 14 and 12, respectively, in the region of annular groove 27 in preparation for welding end faces 20 and 22 (FIG. 4) together. When heaters 130, 131, 132, 133 and 136 are activated, clip gauge 82 is subjected to heat therefrom and may not function accurately due to thermal expansion of components of clip gauge 82. Therefore, clip gauge 82 is removed from annular groove 27 after heaters 130, 131, 132, 133 and 136 are activated. Optimal axial alignment between shaft segment 12 and shaft segment 14 is maintained after clip gauge 82 is removed by maintaining optimal force (as indicated by load cell 68 (FIG. 2) at support point 60 (FIG. 2) of leveraging means 50. Optimal force is the force previously determined which minmizes axial distance variances in annular groove 27.

In one embodiment for welding end face 20 to end face 22, the root pass of the weld may be accomplished by shielded metal arc welding with a coated electrode. To minimize root cracking in this weld, the reading on the load cell, corresponding to optimal axial alignment, is maintained during one complete, singular revolution as the root pass of the weld is formed by applying weldment to the radially inner portion of annular groove 27. As is well known to persons of ordinary skill in the art, weld cracking in the weld seam in annular groove 27 should be avoided to maintain integrity, strength, and other desirable attributes of the weld. The weldment is applied circumferentially in singular sweeps in annular groove 27 while rotating rotor 10. Additional welding of end face 20 to end face 22 may be accomplished by submerged arc welding.

Bolting means 30 (FIG. 1) is operated to apply a substantial axial compressive force on crushable lip 116

(FIG. 4) such that residual stresses created by welding in annular groove 27 are small relative to the axially compressive force applied. Residual stresses are transferred to prestressed crushable lip 116 (FIG. 4). Lip 116 (FIG. 4) is partially crushed by axially compressive force as applied by bolting means 30 and any additional residual stress due to thermal expansion and/or contraction created by welding further assists to crush lip 116 (FIG. 4). In a preferred embodiment, lip 116 (FIG. 4) has a small radial dimension, on the order of one-eighth of an inch, relative to the radial dimension of annular groove 27, which may be on the order of five inches. Also, the axial cross section of lip 116 (FIG. 4) is relatively small compared with the axial cross section of the weld which ultimately fills annular groove 27. Residual stresses developed by welding are not completely understood by persons of ordinary skill in the art. Therefore, the compressive force on lip 116 (FIG. 4) created by bolting means 30 (FIG. 1) is adjusted to be significantly greater than the magnitude of any theoretically computed residual stress which may exist.

The radial cross-sectional area of lip 116 (FIG. 4) is approximately equal to the radial cross-sectional area of bolting means 30 (FIG. 1) and the axial extent of bolting means 30 (FIG. 1) may be typically about 500 times greater than the axial extent of lip 116 (FIG. 4). Hence, bolting means 30 experiences about 500 times the deformation of lip 116 (FIG. 4). That is for example, if lip 116 (FIG. 4) is crushed 10% of its axial dimension, bolting means 30 (FIG. 1) would be shortened by only 0.02% of its preload dimension. Since the compressive force developed by bolting means 30 (FIG. 1) is predeterminedly adjusted to be significantly greater than residual stresses created by welding, bolting means 30 (FIG. 1) essentially maintains its axial extent and ability to secure shaft segments 12 and 14 together even if lip 116 (FIG. 4) is completely axially crushed. In this fashion, annular groove 27 provides a thermal contraction volume which allows shaft segment 12 and shaft segment 14 to axially move relative to each other, wherein such movement may be due to residual stress developed during welding, or cooling of the weldment. In this case, residual stresses are relieved by causing crushable lip 116 (FIG. 4) to deform rather than causing the weldment to crack.

Figure 6:
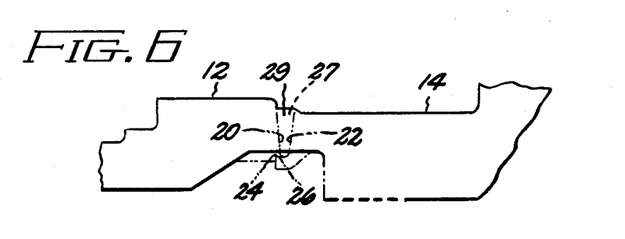
FIG. 6 illustrates a tangential, partial schematic view of a completed, welded shaft showing from where portions of the joined shaft segments have been removed and location of the filled annular groove in accordance with the present invention.

FIG. 6 illustrates a tangential, partial, schematic view of shaft segments 12 and 14 after welding. Annular groove 27, end faces 20 and 22, and joint faces 24 and 26 are shown by dashed lines indicating weldment 29 has blended and fused the outer margins thereof. As shown in FIG. 6, joint faces 24 and 26 and other radially inner portions of shaft segments 12 and 14 may be removed such as by machining.

Thus has been illustrated and described a method and apparatus for axially aligning shaft segments of a steam turbine rotor and maintaining axial alignment while welding opposing end faces of the shaft segments together. Further, a method and apparatus for reducing the possibility of weld cracking during cooling of the weldment and regions of the shaft segments adjacent the weldment and for reducing the possibility of inclusions developed in the weld have been shown and described. Additionally, a method and apparatus for maintaining axial alignment of the shaft segments during application of heat in the region adjacent end faces of the segments have been illustrated and described.

Additional modifications may occur to those of ordinary skill in the art. For example, a person of ordinary skill in the art recognizes that many different types of leveraging means could be utilized to obtain the optimal axial alignment between end faces 20 and 22. Also, a person of ordinary skill in the art recognizes that a plurality of clip gauges could be utilized circumferentially disposed at radially equidistant locations in the annular groove 27 rather than the single gauge discussed herein. Means for adjusting the height of lever arm 54 of leveraging means 50 alters the axial distances in the annular groove. By plotting the changes in the various signals from the plurality of clip gauges, an optimum axial alignment could be achieved, and a reading taken from the load cell relating force 64 to that otpimal axial alignment.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. Apparatus for axially aligning respective adjacent opposing end faces of a first and a second shaft segment of a steam turbine rotor to be welded together, said opposing end faces respectively disposed on an axial inboard end of said first and second shaft segment, respectively, said first shaft segment having a bore through its axial centerline and said second shaft segment having at least a partial bore through its axial centerline, said partial bore terminating at the opposing end face of said second shaft segment, said apparatus comprising:

bolting means for forceably axially compressively engaging the inboard end of said first shaft segment with the inboard end of said second shaft segment, wherein said opposing end faces are appropriately contoured such that said opposing end faces are mutually mated and an annular groove for receiving a weldment is formed between the opposing end face of said first and second shaft segment respectively;

supporting means for rotatably supporting said first and second shaft segments;

adjusting means to be coupled to one of said first and second shaft segments for altering the elevation at the axially inboard end of said one of said first and second shaft segments with respect to the elevation at the axially inboard end of the other of said first and second shaft segments; and minimizing means for minimizing the axial variance in said annular groove between said adjacent end faces of said first and second shaft segments when said first and second shaft segments are rotated while maintaining the same relative position with respect to each other.

2. The apparatus as in claim 1, further comprising heating means to be coupled to said first and second shaft segments, respectively, for heating said first and second shaft segments adjacent said annular groove.

3. The apparatus as in claim 1, wherein said first and second shaft segments are mated such as to include respectively coextensive centerlines and said minimizing means comprises:

measuring means to be coupled to at least one of said first and second shaft segments adjacent said groove, said measuring means for measuring the axial distance across said annular groove at a predetermined circumferential path from the centerline of the mated first and second shaft segments; and comparing means coupled to said measuring means for comparing the axial distance across said annular groove along the entire circumferential path, such that said adjusting means may be operated to provide minimal axial distance variation across said annular groove along the entire circumferential path.

4. The apparatus as in claim 3, further comprising rotation means for rotating said first and second shaft segments, wherein said measuring means comprises a clip gauge and said comparing means comprises display means for relating the speed of rotation of the first and second shaft segments developed by said rotation means to axial variances of said annular groove sensed by said clip gauge as said first and second shaft segments are rotated.

5. The apparatus as in claim 1, wherein said supporting means comprises a first section for coupling to the axially outboard end of said first shaft segment and a second section for coupling to the axially outboard end of said second shaft segment.

6. The apparatus as in claim 5, wherein said supporting means includes headstock means and tailstock means for connecting at the axial centerline at the outboard end of said first and said second shaft segments respectively.

7. The apparatus as in claim 1, wherein said adjusting means comprises indicating means for displaying force exerted on said adjusting means by said first and second shaft segments.

8. The apparatus as in claim 7, wherein said adjusting means further comprises:

leveraging means for supporting said one of said first and second shaft segments, said leveraging means including a lever arm pivotly secured to a support; and biasing means coupled to said lever arm for causing said lever arm to pivot at said support, and further wherein said indicating means is coupled to said biasing means for indicating the force exerted on said adjusting means through said lever arm by said first and second shaft segments.

9. The apparatus as in claim 1, wherein said bolting means comprises a rod extendable through the bore of said first shaft segment and securable at an axial end of said rod to said second shaft segment, the other axial end of the rod for coupling to the outboard end of said first shaft segment.

10. The apparatus as in claim 9, wherein the axial end of said rod is threaded and the bore of said second shaft segment includes threads extending at least partially into the bore, the threads of the axial end matingly engageable with at least a portion of the threads of the bore of said second shaft segment and further wherein the other axial end of said rod is threaded for receiving a threaded member matingly threaded onto the other end such that said threaded member engages the axially outboard end of said first shaft segment, whereby said first shaft segment may be axially compressively engaged with said second shaft segment by tightening said threaded member onto said rod.

11. The apparatus as in claim 1, wherein the radial cross-sectional area of said bolting means is approximately equal to the radial cross-sectional area of a crushable annular lip axially extending from one of said joint faces, said lip for relieving stress in a weldment to be disposed in said annular groove.

12. The apparatus as in claim 1, wherein the amount of the axially compressive force on a crushable annular lip axially extending from one of said joint faces for relieving stress in a weldment to be disposed in said annular groove to be provided by said bolting means is greater than the residual stress developed by thermal contraction of a weld to be disposed in saaid annular groove.

13. Apparatus for axially aligning respective adjacent opposing end faces of a first and a second shaft segment of a steam turbine rotor to be welded together, said first shaft segment having a bore through its axial centerline and said second shaft segment having at least a partial bore through its axial centerline terminating at the opposing end face of said second shaft segment, said apparatus comprising:

bolting means for forceably compressively engaging said first shaft segment with said second shaft segment such that said pair of joint faces are mutually mated;

supporting means for rotatably supporting said first and second shaft segments, one section of the supporting means to be connected to the axially outboard end of said bolting means, another section of said supporting means to be connected to the axially outboard end of said second shaft segment;

adjusting means for adjusting the elevation of one of said shaft segments at an axially distant location from the corresponding axially outboard end of said one shaft segment, said adjusting means including means for measuring the force at said location, which force counteracts the transmitted component of weight of said first and second shaft segments supported by said adjusting means; and minimizing means for minimizing the axial variance in said annular groove between said adjacent end faces of said first and second shaft segments, said minimizing means including measuring means and comparing means for measuring and comparing, respectively, the axial distance across said annular groove at each of a plurality of circumferential and radially equidistant locations, respectively.

* * * * *